Figure 1:
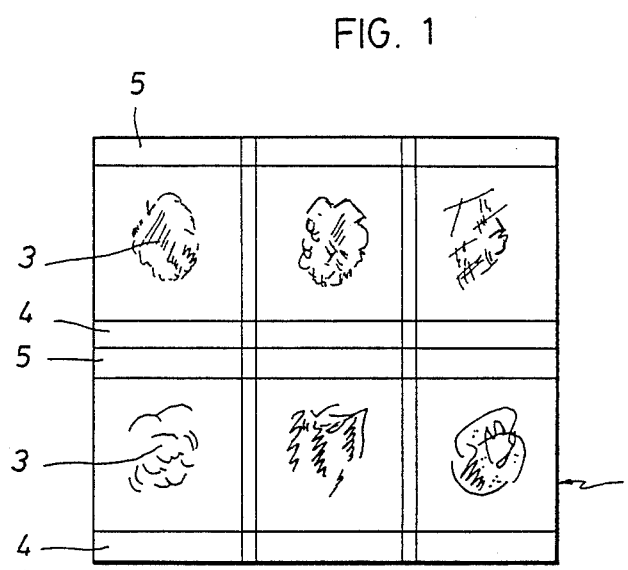

United States Patent [19]
Palou et al.

[11] Patent Number: 4,943,054
[45] Date of Patent: Jul. 24, 1990

[54] MENTAL GAME

[76] Inventors: Antonio S. Palou, Aribau 271, 08021; Margarita V. Tarragona, Pedralbes 18, 08021, both of Barcelona, Spain

[21] Appl. No.: 399,065

[22] Filed: Aug. 23, 1989

[30] Foreign Application Priority Data
Jan. 4, 1989 [ES] Spain .................................. 8900020

[51] Int. Cl.$^5$ .............................................. A63F 9/18
[52] U.S. Cl. ..................................... 273/1 R; 434/347
[58] Field of Search ................. 273/1 R; 434/347, 348

[56] References Cited

U.S. PATENT DOCUMENTS

| | | | |
|---|---|---|---|
| 1,525,696 | 2/1925 | Spencer | 434/347 |
| 1,617,657 | 2/1927 | Studebaker | 434/347 |
| 1,982,611 | 11/1934 | Hartnett | 434/348 |
| 2,717,156 | 9/1955 | Nelson | 434/347 X |
| 3,055,118 | 9/1962 | Betancourt | 434/348 |
| 3,939,578 | 2/1976 | Coffey | 434/347 |

FOREIGN PATENT DOCUMENTS

| | | | |
|---|---|---|---|
| 1017128 | 1/1966 | United Kingdom | 434/348 |
| 2126404 | 3/1984 | United Kingdom | 434/347 |

*Primary Examiner*—Paul E. Shapiro
*Attorney, Agent, or Firm*—Staas & Halsey

[57] ABSTRACT

The game comprises supports formed by two superimposed sheets. Cards of a like size, drawn randomly, are housed in the supports and bear on each side one or more first areas in which there is an illustration and first captions relating to the illustration and one or more second areas, in which there are second captions related with the first captions on the opposite side. The sheets of the supports are provided with windows and slots allowing the first areas on one side of the card and corresponding second areas on the opposite of the card to be contemplated.

6 Claims, 2 Drawing Sheets

MENTAL GAME

The invention relates to a mental game in which the knowledge and memory of the players are put to trial. The players are awarded points depending on the right answers made. The game is also suitable for individual amusement.

The said knowledge relates to any type of persons, figures, images, historical or present day events or objects. The games is played on the basis of showing illustrations to the players as individuals or forming teams.

The game is characterised in that it comprises: a plurality of cards having a front face and a back face, each of said cards having on at least the front face at least one first area containing an illustration and at least one caption and on at least the rear face a second area in which there is at least one second caption; a plurality of supports, each of which is formed by mutually superimposable first and second sheets, at least one of said sheets having means adapted to determine first and second set positions for at least one card, said first sheet being provided with at least one opening which, when the support contains at least one card, is adapted to be superimposed on one of the first areas of said card, while said second sheet is provided with at least one slot which, when the support contains at least one card, is adapted to be superimposed on one of the second areas of the same card.

Figure 2:
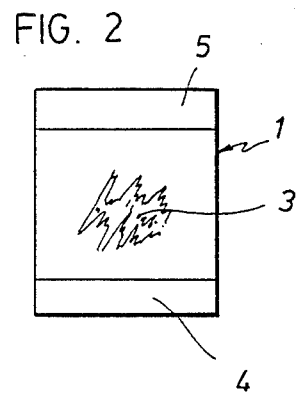
Figure 3:
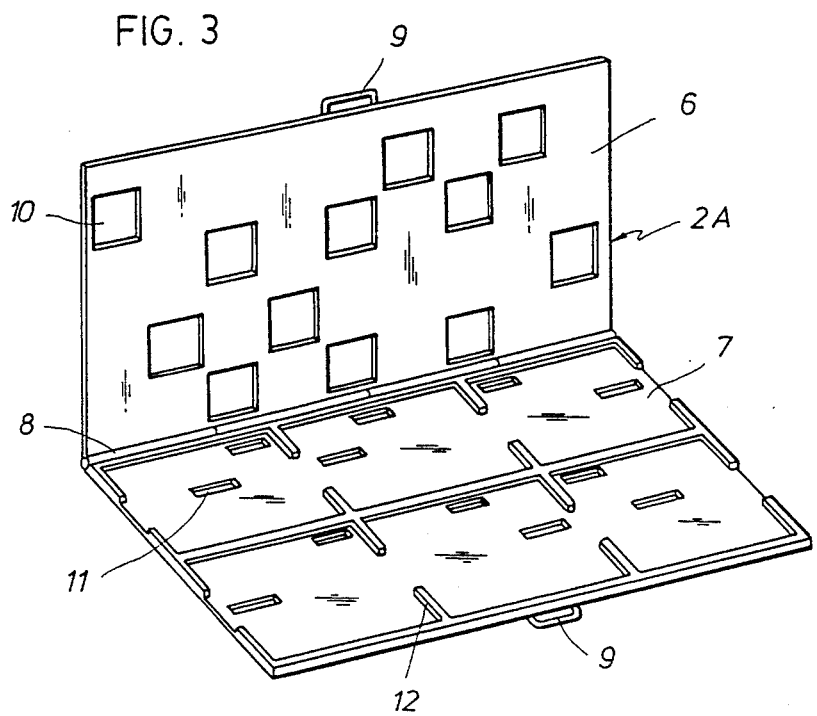
Figure 4:
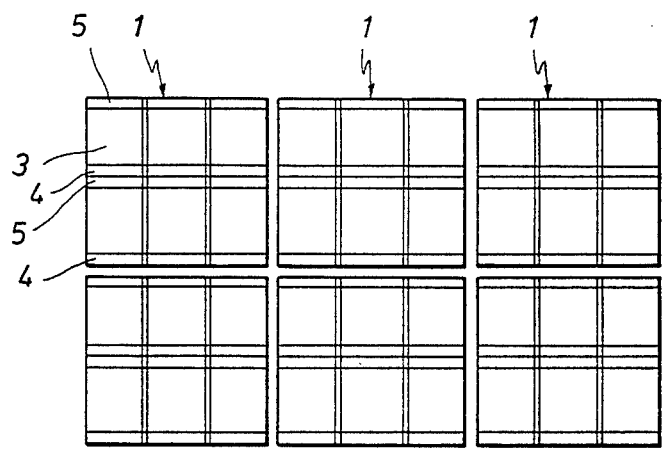
Figure 5:
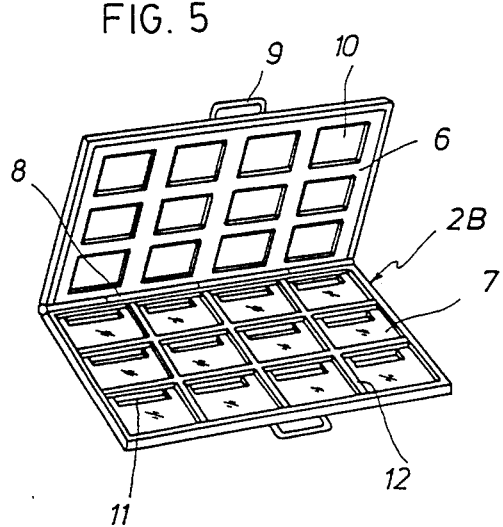

Other advantages and features of the invention will be appreciated from the following description in which, without any limitative nature, there is described a preferred embodiment of the invention, with reference to the accompanying drawings. The drawings show:

FIG. 1 a view of one face of a card containing a plurality of first areas and second areas;

FIG. 2 a view of one face of a card containing a single first area and a single second area;

FIG. 3 a perspective view of a support for cards of the type shown in FIG. 1, the support being in open position and containing openings and slots only for part of the first and second areas of the cards;

FIG. 4 a front view of a set of cards prepared for housing in a support of the type illustrated in FIG. 3;

FIG. 5 a perspective view of a further embodiment of a support, also in open position, containing openings and slots for all the cards.

The game of the invention comprises cards 1 to be contained in a support 2A or 2B. Each card has a front face and a rear face and is provided on at least the front face with at least one first area 3,4 containing an illustration 3 and at least one first caption contained in a space 4; on at least the rear face, the same card is provided with a second area 5 wherein there is to be found at least one second caption.

In this specification, the word "illustration" is given a broad meaning and therefore may contain words and/or picture images and relate to persons, animals, plants, monuments, buildings, landscapes, vehicles, scenes from movies, anagrams, shields, flags, formulae, problems, hieroglyphics, paintings or other works of art and sundry objects, all of which are represented by photographs, drawings, prints or in other ways. The illustrations relating to persons correspond to artists, scientists, sportspersons, historical or present figures, etc.

In turn, each first caption contained in a space 4 belonging to a first area 3,4 bears a conceptual relationship with the illustration 3 of the same first area 3,4 and this conceptual relationship consists of each first caption being a question relating to the illustration 3; it is noted that a single space 4 may contain more than one first caption, i.e., more than one question relating to the same illustration.

Each first area 3,4 mates with a second area 5. Preferably, such mating occurs because one first area 3,4 is in a portion of the front face of the card and the corresponding second area 5 is on the back of the same portion, i.e., both areas a mutually opposed.

Each first caption contained in a space 4 belonging to a first area 3,4 bears, in turn, a conceptual relationship with a second caption contained in a corresponding second area 5 and this conceptual relationship consists of each second caption being a response to the question contained in the first caption.

The cards 1, for each game, are all the same size and are made from materials such as paper, paperboard, plastics or the like.

To make better use of the surface of the cards, it is contemplated that on both faces of a card 1 there should be at least one first area 3,4 and one second area 5. In the case of single cards (See FIG. 2), one face contains an illustration 3, one or more first captions contained in the space 4 and, furthermore, a second area 5 in which there are one or more second captions (responses) relating to the first captions (questions) in a space (not shown) of the back of the same card.

In the case of multiple cards (FIG. 1), one face contains a plurality of first areas 3,4 and a plurality of second areas 5 in which there are one or more second captions related with the first captions contained in the space (not shown) on the corresponding back. In turn, the first captions contained in the spaces 4 shown have a response in the second captions contained in the second areas (not shown) situated on the back.

As said above, the game also comprises supports 2A, 2B. Each support is formed by a first sheet 6 and a second sheet 7 which are mutually superimposable and connected together by hinge means 8 or by other appropriate means. There are also conventional closing members 9. On at least one of the sheets 6,7 there are means 12 (this means is on the sheet 7 in the embodiment shown), adapted to determine first and second set positions for the cards 1 and, in any case, for at least one card 1. The said first position corresponds, for example, to the application of the front face of the card against the sheet 7 and the second position to the application of the rear face of the card against said sheet 7. Preferably there are means (not shown) ensuring that said first and second positions are unique, i.e., the prevent the possibility of positioning a card by turning it over on an axis perpendicular thereto.

The first sheet 6 is provided with one or more openings 10. When the support 2A, 2B contains at least one card 1, and the support is closed by superimposition of the sheets 6,7 thereof, the openings 10 are superimposed over the first areas 3,4 allowing the corresponding illustrations and first captions of the first area 4 to be seen, but hiding the second areas 5. In turn, the second sheet 7 is provided with slots 11. When the support is closed containing cards, said slots are superimposed over second areas 5, the rest of the card face being hidden.

In a support 2B of FIG. 5, the first sheet 6 is provided with openings 10 for all the illustrations 3 of one face of a card 1 and the second sheet 7 is provided with slots 11 for all the second areas 5 of the opposite face of the card.

In a support 2A, the first sheet 6 is provided with openings 10 each dimensioned to embrace one first area 3,4 of one face of a card and the second sheet 7 is provided with slots 11 allowing the second areas 5 of the opposite face of the card corresponding to the first areas 3,4 visible through the windows 10 to be seen.

The supports 2A and 2B are made of cardboard, plastics, metal or other material and are provided with means allowing them to be differentiated and which may consist of diverse colours, different numbers or symbols or other means.

Preferably the different supports 2A of one game will have a different distribution of openings 10 and slots 11 different from one another, whereby the illustrations 3 visible in each case will depend on the card chosen and on the support 2A in which it is placed.

It is contemplated to locate removable strips over the slots 11 for hiding the corresponding second areas during the contest. It is also contemplated that the cards may be contained on a magnetic support, such as a video or audio tape.

Although the game has been designed for several players, its use by a single person for entertainment purposes is not dismissed.

The rules of the game allow several variations, among which the following are cited:

Version 1: once the number of players, as individuals or teams, has been decided, a like number of supports are prepared, with a complete set of cards 1 selected randomly and in a way to avoid premature observations, for which purpose a referee or neutral person may be used for such preparations. Thereafter, one support is dealt out to each person or team, and each of them will write down the answer it believes to be correct, for which purpose a time limit is set. Once the time has expired, the supports are exchanged between the players and this process continues correlatively until each player has received all the supports. In this way, when all the time limits have expired, all the players have had identical possibilities. Once the time limits for answering have expired, they are examined by comparing them with the answers appearing in the second areas 5 of the respective cards 1, by removing any hiding tapes previously applied, with the pertinent points being awarded, i.e., one for each correct answer. For keeping the score, special sheets are used one for each player or team, provided with appropriate boxes for facilitating the sums which will provide the final results.

Version 2: Once the number of individual players or teams has been decided, the number of supports 2A or 2B it is wanted to play is prepared. Once the order of play of the different players has been decided by lot, the player designated to start the game responds verbally to the questions relating to an illustration of the first support. Once he or she has answered, the masking tape is removed from the corresponding response, and the pertinent points for the correct answers are scored. The player will continue playing on the following illustration if he has not failed any of the responses required.

The routine continues until a mistake is made, the turn then moving on to another player who shall respond as from the following illustration. The game finishes when all the supports it has been decided to play have been played, the winner being the player who has scored most points.

What we claim is:

1. A mental game comprising: a plurality of cards having a front face and a back face, each of said cards having on at least the front face at least one first area containing an illustration and at least one caption and on at least the rear face a second area in which there is at least one second caption; a plurality of supports, each of which is formed by mutually superimposable first and second sheets, at least one of said sheets having means adapted to determine first and second set positions for at least one card, said first sheet being provided with at least one opening which, when the support contains at least one card, is adapted to be superimposed on one of the first areas of said card, while said second sheet is provided with at least one slot which, when the support contains at least one card, is adapted to be superimposed on one of the second areas of the same card.

2. The game of claim 1 wherein each card is provided, on each of the faces thereof, with a first area in which there is an illustration and at least one first caption and a second area in which there is at least one second caption, such that in said first set position the first area of the front face is superimposed over an opening and the second area of the rear face is superimposed on a slot, while in said second set position, the first area of the rear face is superimposed on an opening and the second area of the front face is superimposed on a slot.

3. The game of claim 1 wherein each card is provided, on each of the faces thereof, with a plurality of first areas having respective illustrations and by at least one respective caption and a plurality of second areas provided with at least one respective second caption each, such that in said first set position at least one of the first areas of the front face is superimposed on an opening and at least one of the second areas of the rear face is superimposed on a slot, while in said second set position, at least one of the first areas of the rear face is superimposed on an opening and at least one of the second areas of the front face is superimposed on a slot.

4. The game of claim 1 wherein each first area of a face of a card forms a front, the reverse of which contains a second area of the other face of the same card.

5. The game of claim 4 wherein each first caption contained in a first area bears a conceptual relationship (a) with the illustration of the same first area and (b) with a second caption contained in a second area located on the reverse of the first area.

6. The game of claim 5 wherein the conceptual relationship between a first caption and an illustration is a question relating to the illustration and the conceptual relationship between a second caption and a first caption is a response to said question.

* * * * *